L. A. WELLSANDT.
CONTAINER FOR STORING BULK WHEAT.
APPLICATION FILED JULY 19, 1916.

1,237,002.

Patented Aug. 14, 1917.
2 SHEETS—SHEET 1.

Inventor
L. A. Wellsandt,
By John L. Dufford.
Attorneys

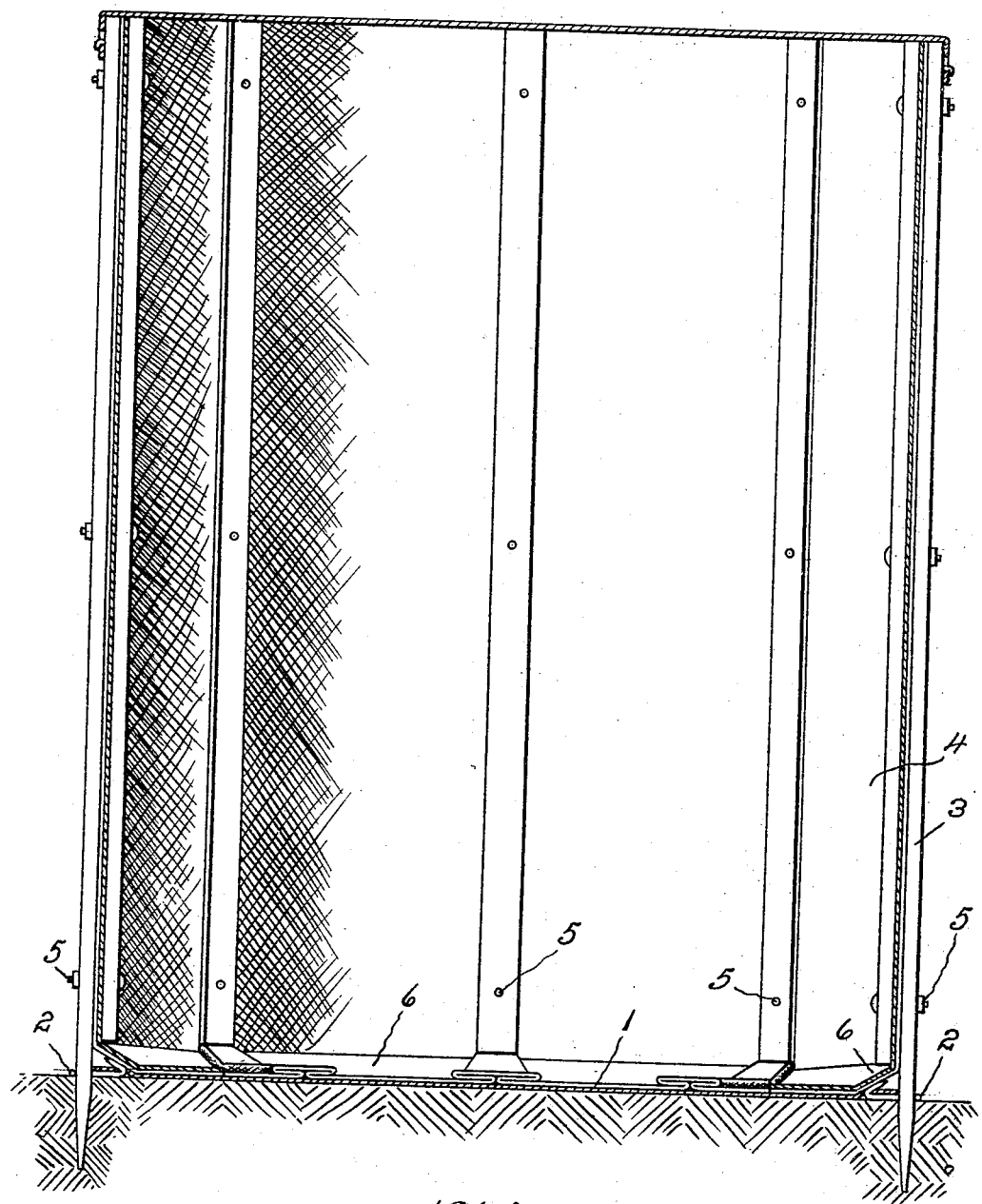

UNITED STATES PATENT OFFICE.

LUDWIG A. WELLSANDT, OF RITZVILLE, WASHINGTON.

CONTAINER FOR STORING BULK WHEAT.

1,237,002.  Specification of Letters Patent.  Patented Aug. 14, 1917.

Application filed July 19, 1916. Serial No. 110,093.

*To all whom it may concern:*

Be it known that LUDWIG A. WELLSANDT, citizen of the United States, residing at Ritzville, in the county of Adams and State of Washington, have invented certain new and useful Improvements in Containers for Storing Bulk Wheat, of which the following is a specification.

My invention has relation to new and useful improvements in containers for storing bulk wheat in the field and elsewhere while the grain is being threshed, without the use of grain sacks.

The main object of my invention is the elimination of sacks or jute bags for handling the grain at the time the wheat is threshed thereby saving the expense of such sacks incident thereto.

A further object of my invention is to provide a device of the above nature that will be simple in construction, efficient in operation and application, inexpensive to the user thereof and one which may be readily and quickly set up for use.

A further object of my invention is to provide means whereby the farmer may be enabled to store his wheat directly at the machine at the identical time that the same is being threshed and means that will preserve it through inclement weather until he is ready to haul his supply to market.

With the foregoing and other objects in view, my invention consists of the novel features of construction, combination and arrangement of parts as are illustrated in the accompanying drawings, described in this specification and particularly pointed out in the appended claims.

Referring to the drawings:

Fig. 2 is a vertical, central sectional view of the same.

Referring more particularly to the drawings, in which like numerals designate like parts throughout, my invention in detail is described as follows:

Figure 1:
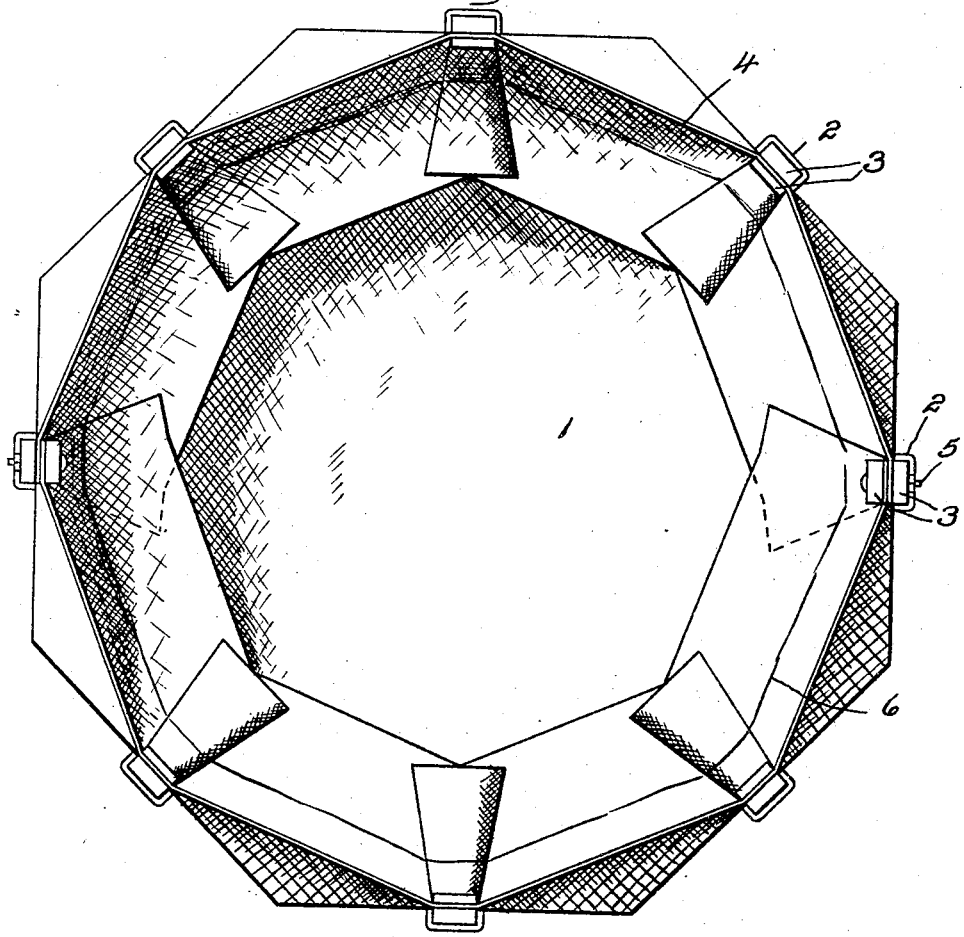
Figure 1 is a top plan view of my invention.

The invention comprises a disk-shaped bottom 1 composed of canvas, which is placed next to the ground, near the edges of which bottom 1 and spaced equi-distant apart around its entire periphery is a plurality of hooks 2, said hooks or wire-connections being substantially U-shaped, the ends thereof being turned back or doubled upon the body-portion thereof.

Extending directly upward from the outer periphery of said bottom and held in proper position by cleats or braces 3 is a canvas wall 4, said wall being composed of a plurality of sections, secured together, if necessary, the number of sections required depending directly upon the size of the container or the quantity of wheat to be stored. Said cleats are each composed of two strips, an outer and an inner, the outer terminating at the lower end in a point, which point extends through its U-shaped hook and into the ground. The inner strip of each cleat falls short of reaching the ground, each two respective strips being secured together by suitable means 5, such as nut and bolt connections, passing therethrough. The inner strip of each cleat is sufficiently short to permit the upright wall 4 of the container to be bent or folded inwardly, slightly, at its lower edge at 6, to prevent the escape of any grains of wheat from the device between the bottom and said wall. (See Fig. 2).

The cover is also to be composed of canvas or burlap and may be secured to the wall as illustrated in the drawings, by means of a bent-pin passing through a perforation in the top near its edge at each cleat, said pin being supported by a cleat and each cleat being provided with a pin. Each pin passes through a respective perforation in said top. Any other suitable means adapted for the purpose may be substituted for the foregoing to secure said top in proper substantial position upon the wall.

Figure 3:
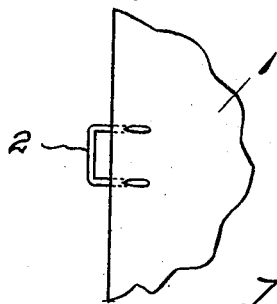
Fig. 3 is a detail.

The inner bent portion of each U-shaped hook engages the bottom 1 of said device, holding the same securely in position to said cleats or braces 3. (See Fig. 3.)

In some cases and whenever found necessary the canvas composing the bottom, wall and top, or either, will be treated with a tarred preparation or its substitute, tending to make them impervious to rain or dampness.

It will be seen that when the device begins to fill with grain it will be strengthened on all sides, each part tending to support and hold in place the other parts.

The height of the wall may be altered to suit the circumstances.

Although I have specifically described the novel features of construction, combination and arrangement of the several parts of my invention yet I do not confine myself to same, but reserve and may exercise the right to make such changes therein as do not depart from the spirit of the invention and as fall within the scope of the appended claims.

Having described my invention, what I claim as new, is:

1. A container of the kind described comprising a canvas base, disk-like in structure, a canvas wall extending upwardly from near the periphery of the former, cleats arranged upon the wall at spaced intervals apart, hooks engaging the bottom near its edge arranged at spaced relation to each other, a respective cleat engaging each of said hooks.

2. A container of the class described comprising a base, disk-shaped in construction, a wall also composed of canvas extending upwardly from the periphery of the base, cleats, each composed of two strips, an inner one and an outer one, arranged upon and connected to the wall at equal intervals apart, hooks, U-shaped in structure with their ends bent back upon themselves, said hooks engaging the base at equal distances apart, each cleat having its outer strip or member pointed, said point of each of said members extending through a respective U-shaped hook or wire connection, said hooks coöperating with said cleats to secure the bottom to the wall, the cleats also being for the purpose of securing the device to the ground, the canvas composing the device adapted to be treated with a tarred preparation or the equivalent thereof.

In testimony whereof I affix my signature in the presence of two witnesses.

LUDWIG A. WELLSANDT.

Witnesses:
W. J. Ross,
J. C. Gillett.

Copies of this patent may be obtained for five cents each, by addressing the "Commissioner of Patents. Washington, D. C."